H. CROSS.
AUTOMATIC CONTROLLING MECHANISM.
APPLICATION FILED AUG. 3, 1909.

1,012,990.

Patented Dec. 26, 1911.

WITNESSES:
Jas. C. Wobrusmith
Mae Hofmann

INVENTOR
Herbert Cross,
BY
Jno. T. Cross, del.
ATTORNEY.

COLUMBIA PLANOGRAPH CO., WASHINGTON, D. C.

UNITED STATES PATENT OFFICE.

HERBERT CROSS, OF PHILADELPHIA, PENNSYLVANIA, ASSIGNOR TO CHAMBERS BROTHERS COMPANY, A CORPORATION OF PENNSYLVANIA.

AUTOMATIC CONTROLLING MECHANISM.

1,012,990.      Specification of Letters Patent.      Patented Dec. 26, 1911.

Application filed August 3, 1909. Serial No. 510,968.

*To all whom it may concern:*

Be it known that I, HERBERT CROSS, a citizen of the United States, residing at Philadelphia, in the county of Philadelphia and State of Pennsylvania, have invented a new and useful Automatic Controlling Mechanism, of which the following is a specification.

My invention relates to improved means for automatic control.

The object is to provide mechanism whereby variation in speed between two rotating elements will cause a translative movement which may be communicated to any desired point.

My device may be applied to a number of purposes.

A specific embodiment of my invention I will now describe as applied to the control of a friction clutch in a brick machine of that class in which a continuous bar of clay is formed and moved and cut into bricks, such for example, as the machine shown in patent to Chambers No. 362,204; May 3, 1887 and patent to King No. 815,022; Mar. 13, 1906. In such devices it has been common to establish operative relationship between the measuring wheel and the cut-off device so that the operation of the cutting device shall be relative to the movement of the clay bar. The difficulty has been however in securing a sufficiently responsive relationship between the movement of the clay bar and the movement of the cut-off.

Figure 1:
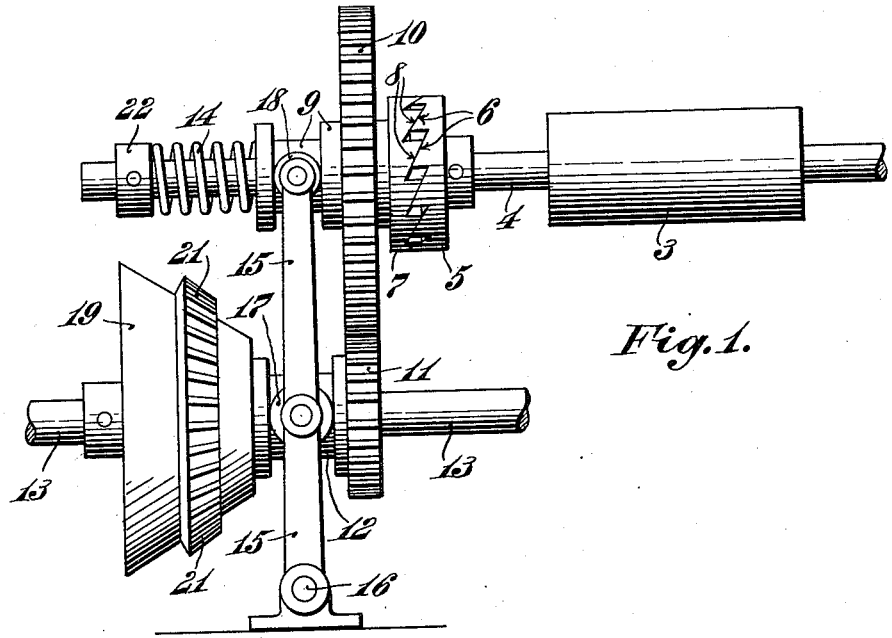
Figure 2:
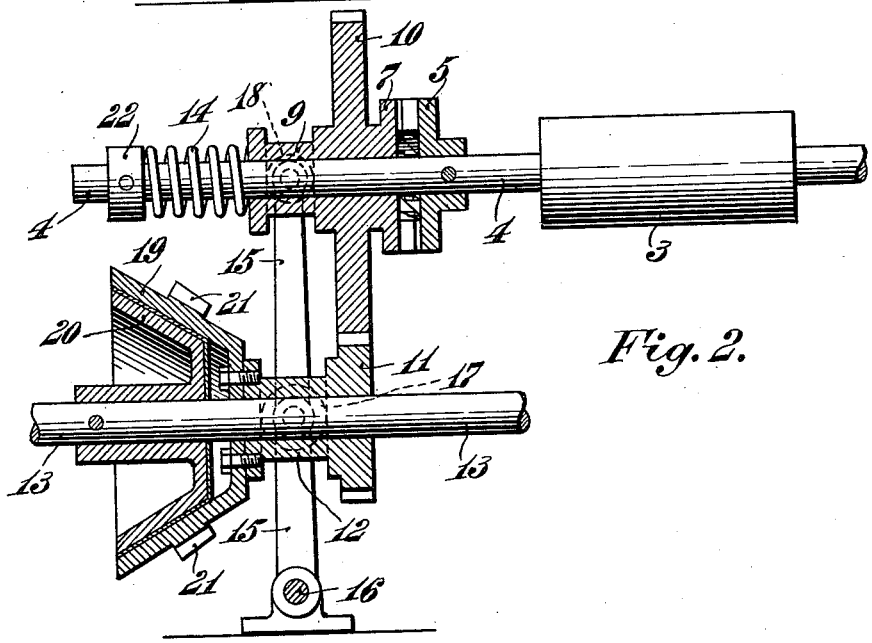

Referring to the drawings:—Figure 1 is an elevation of mechanism showing my invention. Fig. 2 is a vertical section.

Similar numerals refer to similar parts throughout the several views.

The usual measuring wheel employed in such machines is indicated by the numeral 3. On the shaft 4 of the measuring wheel 3 is secured the disk member 5 having the inclined faces 6. Loosely mounted on said shaft 4, or secured in any other suitable way, is the disk member 7, with the correspondingly inclined faces 8. The hub 9 to which disk 7 is secured, carries the gear wheel 10 which is adapted to mesh with gear wheel 11 on hub 12 which is loosely mounted on shaft 13 being the line or main driving shaft. Engagement between the inclined faces 6 and 8 is maintained by the pressure of spring 14 operating between collar 22 and hub 9. The lever 15 is pivoted at 16 to a stationary part of the machine, and is provided with the wheel 17 adapted to work between collars on hub 12. The upper end of lever 15 is also provided with wheel 18 adapted to work between collars on hub 9. Hub 12 is also provided with the element 19 of a friction clutch. The other element 20 of the friction clutch is secured to, and rotates with, the line shaft 13. On element 19 are provided the gear teeth 21 which drive, through other suitable gearing, the cut-off mechanism, not shown.

The operation of my device is as follows: The clutch elements are set up so as to have an efficiency of engagement which will just suffice to drive the cut-off mechanism in approximate time with the speed of rotation of the measuring wheel, and consequently, with the travel of the clay bar. As long as the movement of the cut-off mechanism is constant, with respect to the movement of the clay bar, then it follows—the various gears connecting the cut-off mechanism with the rotating element 7 being properly proportioned,—that the rotation of elements 5 and 7 will correspond, or the said two elements will rotate together. In case however, there should be a fluctuation in the speed of travel of the clay bar, for example, should the clay bar travel faster than normal, and cause the element 5 to travel faster than element 7, it will follow that the inclined surfaces 6 will travel upward upon the inclined surfaces 8 forcing elements 5 and 7 apart. This will move the hub 9 and consequently the lever 15 to cause the movement of hub 12 to the left and cause the friction element 20 to have a more efficient friction engagement with element 19. It will be understood that there is always a slipping engagement between elements 19 and 20, that is, the line shaft 13 runs faster than the parts on the other side of the friction clutch. Such increase of efficiency of clutch engagement will consequently cause the cutting mechanism to speed up to correspond to the increased speed of travel of the clay bar. When the clay bar is retarded so as to travel below normal speed of travel and the speed of rotation of element 5 is consequently less than the speed of rotation of element 7, the inclined faces 6 will move downwardly on inclined faces 8. This will cause the elements 5 and 7 to move closer together which will result in the hub 9 moving to the right causing a movement of hub 12 also to the right and a consequent less efficient engagement between friction clutch elements 19 and 20.

What I claim is:—

1. The combination of two rotating elements, and means for causing a translative movement of one of said elements, upon a variation in speed of rotation between said two elements and a friction clutch affected by said translative movement.

2. The combination of two rotating elements, means for causing a translative movement of one of said rotative elements upon a variation in speed of rotation between said two elements, a frictional clutch, and means for communicating said translative movement to one element of the clutch, to affect the efficiency of frictional engagement.

3. The combination of a friction clutch and means for controlling the clutch, comprising two rotative elements, one element having an inclined face engaging the other element, whereby translative movement is communicated to one of said rotative elements upon variation of speed therebetween, and means for communicating said translative movement to the clutch.

4. The combination of two rotative elements, one element having an inclined face engaging the other element, spring means for maintaining the engagement of said rotative elements, the parts arranged and disposed to cause translative movement of one of said elements upon variation of speed therebetween, coöperating clutch elements and means for communicating said translative movement to one of said clutch elements.

5. The combination of a friction clutch, one clutch element being capable of translative movement, two rotative elements, one having operative relationship with the movable clutch element and also capable of translative movement, one rotative element having an inclined face engaging the other element, whereby said translative movement is caused upon variation of speed between said rotative elements.

HERBERT CROSS.

Witnesses:
 MAE HOFMANN,
 HOWARD S. OKIE.

---

Copies of this patent may be obtained for five cents each, by addressing the "Commissioner of Patents, Washington, D. C."